(12) United States Patent
Bolle

(10) Patent No.: US 7,076,131 B2
(45) Date of Patent: Jul. 11, 2006

(54) PRECISION TWO DIMENSIONAL OPTICAL ARRAY

(75) Inventor: Cristian A Bolle, Bridgewater, NJ (US)

(73) Assignees: Lucent Technologies Inc., Murray Hill, NJ (US); Agere Systems, Inc., Allentown, PA (US)

( * ) Notice: Subject to any disclaimer, the term of this patent is extended or adjusted under 35 U.S.C. 154(b) by 72 days.

(21) Appl. No.: 10/254,133

(22) Filed: Sep. 25, 2002

(65) Prior Publication Data

US 2004/0057664 A1    Mar. 25, 2004

(51) Int. Cl.
G02B 6/32    (2006.01)

(52) U.S. Cl. .......................... 385/33; 385/80
(58) Field of Classification Search ............ 385/32–35, 385/54, 59–61, 71–74, 76–80, 115–120
See application file for complete search history.

(56) References Cited

U.S. PATENT DOCUMENTS

| | | | |
|---|---|---|---|
| 5,394,493 A * | 2/1995 | Ames ........................... | 385/35 |
| 5,400,429 A * | 3/1995 | Ames et al. ................. | 385/147 |
| 5,442,721 A * | 8/1995 | Ames ........................... | 385/26 |
| 5,521,996 A | 5/1996 | Ames et al. .................. | 385/75 |
| 5,675,680 A | 10/1997 | Ames et al. .................. | 385/54 |
| 5,862,278 A * | 1/1999 | Brauch et al. ................ | 385/34 |
| 6,836,602 B1* | 12/2004 | Filhaber et al. .............. | 385/51 |
| 2003/0077036 A1* | 4/2003 | Tanaka et al. ................ | 385/34 |

* cited by examiner

Primary Examiner—Juliana Kang
(74) Attorney, Agent, or Firm—Eugene J. Rosenthal

(57) ABSTRACT

A precise array of collimated light beams may be obtained by employing a chuck to tightly hold as an array a group of precision collimators attached to individual optical fibers. Advantageously, such arrays of collimators may be manufactured to very high tolerances so as to be useful in positioning collimated light beams for all-optical switching.

29 Claims, 2 Drawing Sheets

PRECISION TWO DIMENSIONAL OPTICAL ARRAY

TECHNICAL FIELD

This invention relates to the art of optical arrays, and to methods for making same.

BACKGROUND OF THE INVENTION

It is often desirable to have very precise two-dimensional arrays of collimated light beams coming from optical fibers e.g., for use with an all optical switch. In particular, for single-mode optical fiber, as is typically used in optical communications networks, such fiber often having a core with a diameter of 6–9 microns and a cladding with a diameter of 125 microns, positional tolerances of less than 2 microns from true position and angular tolerances of less than 0.5 degrees are required for each fiber in the fiber array. In the prior art, fiber arrays were made by fabricating a plate into which holes are made, and an individual fiber end is inserted into each hole. The plates may be made from a variety of materials, with silicon or a ceramic being preferred when a very precise array is required. The holes may be made by etching or drilling into the plate, using either mechanical techniques or through the use of a laser. The individual fiber ends are locked into place, e.g., with a small amount of glue. After that, the remaining fiber stubs coming out of the front of the plate are cut off, and the resulting ends are polished flat. Finally an array of lenses is aligned and attached to the fiber array to obtain an array of collimated light beams, each coming from an individual fiber.

Unfortunately, the plates that can be made are usually rather thin, due to limitations in the technology for the plates and their holes. Such a thin plate is able to provide only a rather short guide and hold for each fiber so that, disadvantageously, the mechanical structure of the resulting fiber array is less than desirable. Further disadvantageously, the plates have to be custom-made, which usually requires special tools and expertise. Assembly of the array also requires special skills and precise fixtures. The polishing step at the end of the assembly is not trivial, and it is very time-consuming. Finally, the lens array, a high precision object in itself, has to be carefully aligned and attached to the fiber array.

In U.S. patent applications Ser. Nos. '09/895910 and 09/915964, which are incorporated by reference as if fully set forth herein, certain aspects of the drawbacks of the prior art plate arrangements were overcome but not the difficulty of the alignment of the lens array to the fiber array.

Also in the prior art, fibers have been grouped in bundles for various purposes, e.g., by tying the fibers together or by grouping the fibers inside of a sleeve, e.g., in a fiber cable. However, such groupings do not provide precise alignment and spacing of collimated beams at the exit from the bundle.

SUMMARY OF THE INVENTION

I have recognized that, in accordance with the principles of the invention, a precise array of collimated light beams may be obtained by employing a chuck to tightly hold as an array a group of precision collimators attached to individual optical fibers. Advantageously, such arrays of collimators may be manufactured to very high tolerances so as to be useful in positioning collimated light beams for all-optical switching.

The collimators may also be bonded to each other and/or to the chuck. The bonding is typically performed using glue in the interstices between the collimators themselves, or between the collimators and the chuck. If the collimators are only bonded to each other, once they are so bonded together the chuck may be removed.

The collimators may be conventional, such as those commonly used in the telecommunications industry. For example, the collimators may be quartz rods having one flat end to which the fiber is, or may be, attached, while the other end is lens-shaped to collimate the light coming from the fiber. See for example, U.S. Pat. No. 6,360,039. Alternatively, inflexible short cylinders having a variation in their refraction index, commonly known as GRIN lenses, may be used as the collimating element. The chuck may be fabricated so that it holds the collimators in a straight orientation or in an angled orientation as needed by the application. The requirements for the positions of the beams and the direction in which they point are stringent. However, the requirements for the position of the face of the collimators are not very stringent.

The collimators may be arranged in a hexagonal configuration which provides for better stability. However, other configuration patterns may be employed to meet the requirements of the system in which the array is to be used.

DETAILED DESCRIPTION

Figure 1:
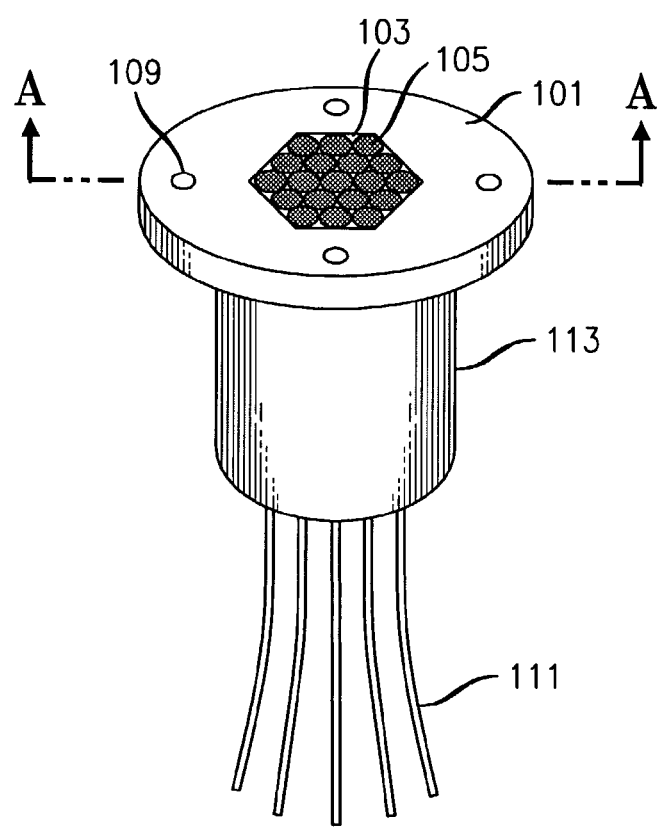
FIG. 1 shows a perspective view of a precise collimator array formed by employing a chuck to tightly hold as an array a group of precision collimators with a fiber previously attached to each one, in accordance with the principles of the invention.

The following merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein.

Unless otherwise explicitly specified herein, the drawings are not drawn to scale.

Additionally, unless otherwise explicitly specified herein, any lens shown and/or described herein is actually an optical system having the particular specified properties of that lens. Such an optical system may be implemented by a single lens element but is not necessarily limited thereto. Similarly, where a mirror is shown and/or described what is actually being shown and/or described is an optical system with the specified properties of such a mirror, which may be implemented by a single mirror element but is not necessarily limited to a single mirror element. This is because, as is well known in the art, various optical systems may provide the same functionality of a single lens element or mirror but in a superior way, e.g., with less distortion. Furthermore, as is well known in the art, the functionality of a curved mirror may be realized via a combination of lenses and mirrors and vice versa. Moreover, any arrangement of optical components that are performing a specified function, e.g., an imaging system, gratings, coated elements, and prisms, may be replaced by any other arrangement of optical components that perform the same specified function. Thus, unless otherwise explicitly specified here, all optical elements or systems that are capable of providing specific function within an overall embodiment disclosed herein are equivalent to one another for purposes of the present disclosure.

In the description, identically numbered components within different ones of the FIGS. refer to the same components.

FIG. 1 shows a perspective view of a precise collimator array formed by employing a chuck to tightly hold as an array a group of precision collimators, to each of which is bonded a fiber, in accordance with the principles of the invention. More specifically, shown in FIG. 1 is chuck 101 which has a hexagonal hole 103 into which are inserted precision collimators 105. Within the face of chuck 101 can be seen optional mounting holes 109.

Chuck 101 holds collimators 105 in place initially at least through the use of pressure. One method of assembling collimators 105 within chuck 101 is to insert most of collimators 105 within hole 103 of chuck 101. Chuck 101 is then heated, so that it expands sufficiently to enable insertion of the rest of collimators 105 within hole 103. The rest of collimators 105 are then inserted within hole 103, and chuck 101 is then allowed to cool down. Upon cooling, chuck 101 contracts sufficiently to exert the necessary pressure on collimators 105. Note that in heating chuck 101 typically collimators 105 are also heated and expand in size. However, collimators 105 are made from a material, e.g., silica, which expands less for the same change in temperature as does chuck 101, which is typically metal or plastic. Thus, it becomes possible to insert the remaining collimators. The tolerances employed are very high, and the differences in size between hole 103 and the collimator array is very small, yet the difference in size resulting from thermal expansion is sufficient to insert the remaining collimators.

After the collimators are inserted into chuck 101, glue may be employed to hold the collimators to each other and/or to chuck 101. Furthermore, coupled to chuck 101 is optional strain relief sleeve 113, through which the optical fibers 111 pass. Fibers 111 are optionally encased in glue within strain relief sleeve 113, which couples the fibers to each other and to strain relief sleeve 113. Such glue provides strain relief for fibers 111. Note that fibers 111 may be encased in glue and after the glue dries any mold used for shaping the glue may be removed.

Optional reinforcing sleeve 113 may be a separate component coupled to chuck 101, e.g., by gluing or other mechanical coupling, or reinforcing sleeve 113 may be integrated with chuck 101 to form a single unit.

Optional mounting holes 109 may be used for various purposes such as 1) to mount the collimator array to a housing, 2) to attach other lenses or devices to the array, or 3) to attach reinforcing sleeve 113 to chuck 101.

Figure 2:
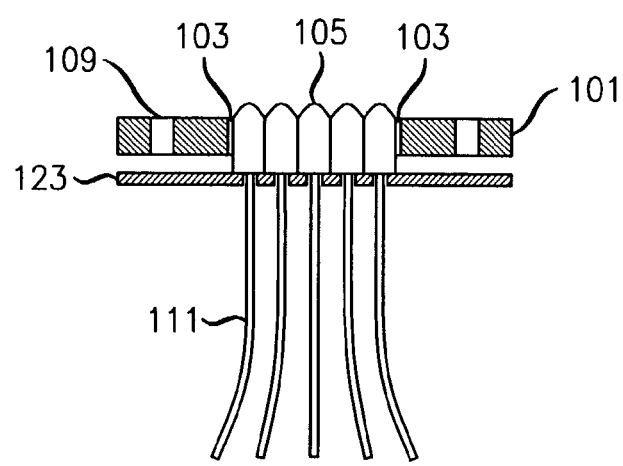
FIG. 2 shows a cross-sectional view of the precise collimator array along axis AA of FIG. 1.

FIG. 2 shows a cross-sectional view of the precise collimator array along axis AA of FIG. 1. The ends of fibers 111 can be seen in FIG. 2 to be coupled to the back of collimators 105. To this end, for clarity purposes, optional reinforcing sleeve 113 is not shown in, or can be considered not to be included in the embodiment of, FIG. 2. Note that FIG. 2 shows five (5) collimators 105 and five (5) fibers 111.

Collimators 105 are each typically arranged to terminate substantially coplanar with the end of the chuck 101 through whose hole 103 they pass. One exemplary way that this may be achieved is by holding the collimators down by pushing each row from the back on a row-by-row sequential basis. Another exemplary way in which this may be achieved is by using a sieve-like structure, such as alignment support 123, to position all of the collimators at the back of the array. Each optical fiber would go through one sieve hole and a portion of the end of the collimator attached to the fiber would abut alignment support 123. Alternatively a special vacuum chuck may be employed to hold collimators 105 down from the top, e.g., the lens shaped end.

Alternatively non coplanar arrangements may be obtained for the collimators. To this end, alignment support 123 may have the contour of its surface that abuts collimators 105 be shaped into a desired shape and the "surface" formed by the lens-shaped ends of the collimators will then substantially follow this shape. To achieve the desired shape, alignment support 123 may have uniform thickness, or it may have a variable thickness. Alignment support 123 may be removed after the collimator array has been formed.

Figure 3:
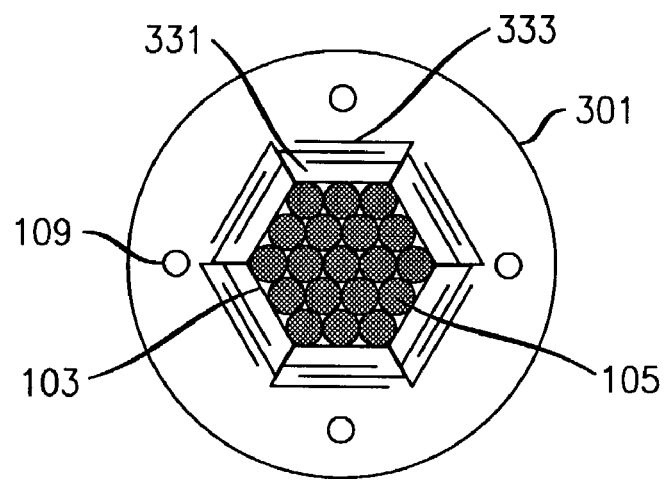
FIG. 3 shows a front view of another embodiment of a precise collimator array formed by employing a chuck to tightly hold as an array a group of precision collimators with a fiber previously attached to each one, and in accordance with the principles of the invention.

FIG. 3 shows a front view of another embodiment of a precise collimator array formed by employing a chuck to tightly hold as an array a group of precision collimators 105 to each of which is bonded a fiber end of one of fibers 111 (not visible), in accordance with the principles of the invention. The precise collimator array of FIG. 3 is identical to that shown in FIG. 1 except for the substitution of chuck 301 for chuck 101. Within chuck 301 are fabricated flexible beams 331, which act as springs. Flexible beams 331 may be made by employing electric discharge milling (EDM) to cut slots 333 through chuck 301.

Hole 103 is cut to be just slightly smaller than the array of collimators 105. Inserting collimators 105 forces the springs to displace slightly, causing expansion of hole 103. As a result, the springs exert a constant restorative force against collimators 105 holding them securely together with the desired precise spacing and alignment.

In some embodiments of the invention, the restorative force is on the order of 20 pounds. However, the restorative force necessary will need to be determined by the implementer given the specific design and materials used. Those of ordinary skill in the art will be able to readily determine the appropriate amount of force.

Optionally, as may be appropriate for any embodiment of the invention, to improve performance of the array, a thin sheet of elastic material, e.g., a plastic or polyester such as Mylar®, which is a trademark of DuPont, may be inserted between the walls making up hole 103 and the ones of collimators 105 that abut the walls of hole 103. Doing so helps to even out the irregularities in the walls making up hole 103.

Figure 4:
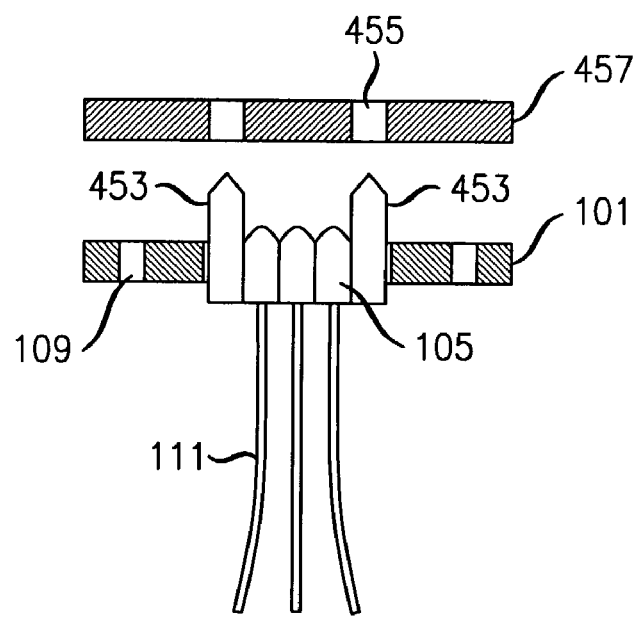
FIG. 4 shows the use of alignment members in lieu of collimators.

As shown in FIG. 4, in lieu of collimators, some positions in the precise collimator array could be used to contain alignment members 453 of substantially the same dimensions as seen in the front view of FIG. 3 of the collimators used, e.g., the same radius for cylindrical collimators, at the position at which the alignment member is substituted for a collimator. FIG. 4 is shown from the same point of view as for FIG. 2. Alignment members 453 may be pins, fibers, wires, or the like, which are used to align a further component or array, e.g., a lens array, an array of detectors, an array of micro machines, or the like, with the precise collimator array. To this end, each alignment member must protrude from the face of the precise collimator array so that it may be extended into a corresponding hole in the further array. In FIG. 4, members 453 extend to mate with alignment holes 455 of further array 457.

Although the chuck has been shown to be round in most of the embodiments, this need not be so. Any other shape desired may be used for the chuck. Furthermore, although the interior hole of the chuck has been shown to be hexagonal, those of ordinary skill in the art will readily appreciate that any other shape desired may be employed as well. Additionally, although hexagonal packing of the collimators has been shown, other packing, e.g., square packing, is not precluded from use with the invention. Those of ordinary skill in the art will readily appreciate that spring designs other than those explicitly depicted herein may be employed by applying the principles of the invention.

Note that herein the chuck has been shown remaining as part of the final array, even when the collimators are bonded to each other through the use of glue. However, if the collimators are bonded together, thereafter the chuck may be removed.

Although the collimators have been shown being substantially uniform in their respective sizes, lengths, and diameters, different size collimators may be used in a single array. The difference in size may be used a) to shape the "surface" formed by the lens-shaped ends of the collimators, b) to provide for differing packing arrangements, e.g., a larger diameter collimator surrounded by smaller diameter collimators, or c) to accommodate other optical requirements.

What is claimed is:

1. An apparatus, comprising
a chuck formed of a rigid material;
a plurality of collimators;
a plurality of optical fibers;
wherein said chuck holds said collimators in an array and an end of each of said fibers is bonded to a respective one of said collimators;
wherein said chuck is fabricated to include at least one flexible member, said flexible member exerting a restoring force towards the center of said chuck, thereby helping to keep said collimators held in said array.

2. The invention as defined in claim 1 wherein said collimators are bonded to each other using glue.

3. The invention as defined in claim 1 wherein said collimators are arranged to be perpendicular to a face of said chuck.

4. The invention as defined in claim 1 wherein said collimators are arranged at an angle to a face of said chuck.

5. The invention as defined in claim 1 wherein said array is a hexagonal array.

6. The invention as defined in claim 1 further comprising an alignment support that has a non-planar surface that abuts the ends of said collimators bonded to said fibers and through which said fibers pass.

7. The invention as defined in claim 1 wherein for each of a subset of at least two of said collimators their respective point opposite to and furthest from where said fibers are bonded are substantially coplanar.

8. The invention as defined in claim 7 wherein at least one of said collimators has its point opposite to and furthest from where said fibers are bonded being not substantially coplanar with said respective points opposite to and furthest from where said fibers are bonded of said subset.

9. The invention as defined in claim 1 further comprising a layer of a non-rigid material interposed between said chuck and said collimators that abut said chuck, said material being non-rigid with respect to said chuck and said collimators.

10. The invention as defined in claim 9 wherein said non-rigid material is plastic.

11. The invention as defined in claim 9 wherein said non-rigid material is a polyester.

12. The invention as defined in claim 1 further comprising at least one alignment member positioned in said array in lieu of a collimator.

13. The invention as defined in claim 1 further comprising a reinforcing sleeve coupled to said chuck.

14. The invention as defined in claim 1 further comprising a reinforcing sleeve integrated with said chuck.

15. The invention as defined in claim 1 further comprising glue in the interstices between said collimators which acts to couple said collimators to each other.

16. The invention as defined in claim 1 wherein said chuck has mounting holes within it which are adapted fur mounting said apparatus to a further device to which said apparatus is coupled.

17. The invention as defined in claim 1 wherein at least one of said collimators has at least one of its dimensions that is different from at least one other of said collimators.

18. The invention as defined in claim 1 wherein at least one of said collimators has a shape that is different from at least one other of said collimators.

19. An apparatus, comprising
a chuck;
a plurality of collimators;
a plurality of optical fibers;
wherein said chuck holds said collimators in an array and an end of each of said fibers is bonded to a respective one of said collimators; and
an alignment support that has a surface which abuts the ends of said collimators bonded to said fibers and through which said fibers pass.

20. An method for making a precision collimator array, the method comprising the steps of:

securing a plurality of collimators in a chuck formed of a rigid material having at least one flexible member, said flexible member exerting a restoring force towards the center of said chuck, thereby helping to keep said collimators held in said array; and bonding each of a plurality of optical fiber ends to a respective one of said plurality of collimators.

21. The invention as defined in claim 20 further comprising the step of bonding each of said collimators to each other.

22. The invention as defined in claim 20 further comprising the steps of:

bonding each of said collimators to each other; and removing said chuck.

23. The invention as defined in claim 20 further comprising the step of coupling a reinforcing ring to said chuck.

24. The invention as defined in claim 21 further comprising the step of:

bonding an alignment member into said array in lieu of one of said collimators so that a portion of said alignment member protrudes from a surface formed by said chuck and said collimators.

25. An apparatus, comprising:

a plurality of collimators tightly held together to form an array;

at least two optical fiber ends, each of said optical fiber ends being bonded to a respective one of said collimators; and an alignment support which defines a surface formed by the points of said collimators furthest from where said optical fibers are bonded to said collimators, said alignment support not being in contact with said collimators at the points that are furthest from where said optical fibers are bonded to said collimators.

26. The invention as defined in claim 25 wherein said collimators are held together by glue.

27. The invention as defined in claim 25 wherein said collimators are held together by a chuck.

28. The invention as defined in claim 25 wherein said apparatus is arranged so that said collimators ends opposite to where said optical fibers are bonded are pointing in substantially the same direction.

29. The invention as defined in claim 25 further comprising at least one alignment member at a position in said array in lieu of a collimator, said at least one alignment member protruding from said array and being adapted to align said apparatus to a further device to which said apparatus is coupled.

* * * * *